(12) United States Patent
De Haan

(10) Patent No.: US 9,848,179 B2
(45) Date of Patent: *Dec. 19, 2017

(54) INTERLACED 3D VIDEO

(71) Applicant: KONINKLIJKE PHILIPS N.V., Eindhoven (NL)

(72) Inventor: Wiebe De Haan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,405

(22) Filed: Dec. 20, 2016

(65) Prior Publication Data

US 2017/0104975 A1 Apr. 13, 2017

Related U.S. Application Data

(63) Continuation of application No. 14/354,605, filed as application No. PCT/IB2012/056539 on Nov. 19, 2012, now Pat. No. 9,560,336.

(Continued)

(30) Foreign Application Priority Data

Nov. 24, 2011 (EP) .................................. 11190435

(51) Int. Cl.
*H04N 13/00* (2006.01)
*H04N 21/41* (2011.01)
(Continued)

(52) U.S. Cl.
CPC ......... *H04N 13/0029* (2013.01); *G09G 5/006* (2013.01); *G09G 5/12* (2013.01);
(Continued)

(58) Field of Classification Search
CPC ........... H04N 13/0029; H04N 13/0048; H04N 13/0454; H04N 2213/007
See application file for complete search history.

(56) References Cited

U.S. PATENT DOCUMENTS

2002/0103966 A1* 8/2002 Wu .................... G06F 11/2087
711/114
2006/0059227 A1 3/2006 Zimler et al.
(Continued)

FOREIGN PATENT DOCUMENTS

EP 0910088 A2 4/1999
EP 1617370 A1 1/2006
(Continued)

OTHER PUBLICATIONS

Blu-Ray Disc White Papear, 2.B Audio Visual Application Format Specifications for BD-ROM Version 2.5, Jul. 2011, 56 Pages.
(Continued)

*Primary Examiner* — Nam Pham

(57) ABSTRACT

A video processing device (100) for processing 3D video is coupled to a 3D display device (120). The device receives the 3D video data according to a high resolution interlaced 3D format. A video processor (106) generates a 3D display signal according to a display format. 3D display capability data indicates at least one interlaced 3D display format accepted by the 3D display device, the interlaced 3D display format having a lower resolution than the high resolution interlaced 3D format. The device has a storage unit (21,31) for storing the 3D display capability data and 3D conversion capability data. The 3D conversion capability data indicates a capability of the video processing device for interlaced down conversion for enabling a selection mechanism to control the processing of the 3D video information by selecting the interlaced 3D display format and the interlaced down conversion. Advantageously the user is provided with the best possible 3D view.

31 Claims, 2 Drawing Sheets

Related U.S. Application Data

(60) Provisional application No. 61/563,865, filed on Nov. 28, 2011.

(51) Int. Cl.

| | | |
|---|---|---|
| *H04N 21/4363* | (2011.01) | |
| *H04N 21/4402* | (2011.01) | |
| *H04N 21/81* | (2011.01) | |
| *G09G 5/00* | (2006.01) | |
| *G09G 5/12* | (2006.01) | |
| *H04N 19/597* | (2014.01) | |
| *H04N 13/04* | (2006.01) | |

(52) U.S. Cl.
CPC ..... *H04N 13/0048* (2013.01); *H04N 13/0055* (2013.01); *H04N 13/0066* (2013.01); *H04N 13/0454* (2013.01); *H04N 19/597* (2014.11); *H04N 21/4122* (2013.01); *H04N 21/43632* (2013.01); *H04N 21/440263* (2013.01); *H04N 21/816* (2013.01); *G09G 2340/14* (2013.01); *G09G 2354/00* (2013.01); *G09G 2370/047* (2013.01); *G09G 2370/12* (2013.01); *H04N 2213/007* (2013.01)

(56) References Cited

U.S. PATENT DOCUMENTS

| | | | | |
|---|---|---|---|---|
| 2006/0279750 | A1* | 12/2006 | Ha | .......... H04N 13/0454 358/1.2 |
| 2007/0263985 | A1* | 11/2007 | Ikeda | .......... G11B 20/10527 386/241 |
| 2008/0031515 | A1 | 2/2008 | Bae et al. | |
| 2009/0284652 | A1 | 11/2009 | Bennett et al. | |
| 2011/0074921 | A1 | 3/2011 | Takiduka et al. | |
| 2011/0141236 | A1 | 6/2011 | Mitani et al. | |
| 2011/0149030 | A1* | 6/2011 | Kang | .......... H04N 13/0029 348/43 |
| 2011/0285706 | A1 | 11/2011 | Daigi | |
| 2012/0069158 | A1 | 3/2012 | Iwamura et al. | |
| 2012/0106921 | A1* | 5/2012 | Sasaki | .......... H04N 13/0048 386/230 |
| 2012/0249736 | A1* | 10/2012 | Barrett | .......... H04N 13/0029 348/43 |
| 2012/0281069 | A1 | 11/2012 | Nishio | |

FOREIGN PATENT DOCUMENTS

| | | |
|---|---|---|
| EP | 2343906 A1 | 7/2011 |
| JP | 2006033851 A | 2/2006 |
| JP | 2009296144 A | 12/2009 |
| JP | 2011077729 A | 4/2011 |
| JP | 2011077785 A | 4/2011 |
| JP | 2011114353 A | 6/2011 |
| JP | 2011205397 A | 10/2011 |
| WO | 2011084169 A1 | 7/2011 |
| WO | 2011099295 A1 | 8/2011 |

OTHER PUBLICATIONS

Anonymous, "High-Definition Multimedia Interface Specification Version 1.4a Extraction of 3D Signaling Portion" HDMI Specification, Mar. 4, 2010, pp. 1-28.

\* cited by examiner

INTERLACED 3D VIDEO

CROSS-REFERENCE TO PRIOR APPLICATIONS

This application claims the benefit or priority of and describes relationships between the following applications: wherein this application is a continuation of U.S. patent application Ser. No. 14/354,605, filed Apr. 28, 2014, which is the National Stage of International Application No. PCT/IB2012/056539 filed Nov. 19, 2012, which claims the priority of foreign application EP11190435, filed Nov. 24, 2011, and U.S. Provisional application 61/563,865, field Nov. 28, 2011 all of which are incorporated herein in whole by reference.

FIELD OF THE INVENTION

The invention relates to a video processing device for processing three dimensional [3D] video information, the 3D video information comprising 3D video data, the device comprising input means for receiving the 3D video data according to an interlaced 3D format having a resolution matching an interlaced frame packing format, a video processor for processing the 3D video information and generating a 3D display signal, the 3D display signal representing the 3D video data according to a display format, and a display interface for interfacing with a 3D display device for transferring the 3D display signal, the display interface being arranged for receiving 3D display capability data from the 3D display device.

The invention further relates to a method for controlling processing of three dimensional [3D] video information, the 3D video information comprising 3D video data according to an interlaced 3D format having a resolution matching an interlaced frame packing format, and said processing the 3D video information comprising generating a 3D display signal for a 3D display device, the 3D display signal representing the 3D video data according to a display format.

The invention relates to the field of processing and displaying 3D video information.

BACKGROUND OF THE INVENTION

Various sources of 3D video information are well known. For High Definition movie publishing, the Blu-ray disc system is widely used. Initially the BD-ROM audio-visual application format only contained support for 2D video. Various video coding options are included in the system, which are all supported by BD-ROM compliant playback devices. One of the supported video codecs is AVC (also known as ISO/IEC MPEG-4 Part 10 and ITU-T H.264). Recently the Blu-ray video distribution system was extended with stereoscopic 3D capabilities based on the Stereo High profile of MVC (Multiview Video Coding), an extension of AVC. The Blu-ray Stereoscopic 3D (S3D) extension is currently restricted to progressive video. Two progressive video modes are defined for BD3D: 1080 line mode at 24 (actually 23.976) frames per second ("1080p24") and 720 line mode at 50 or 60 (actually 59.94) frames per second. For S3D, the video stream is composited of a so-called independent view and a dependent view. The independent view is AVC compliant and can potentially be decoded by BD players that are not designed to decode the full BD3D (MVC) video stream. Background information on the Blu-ray Disc Read-Only Audio Visual Application format can be found in a White Paper published by the Blu-ray Disc Association: http://www.blu-raydisc.com/assets/Downloadablefile/BD-ROM-AV-WhitePaper_110712.pdf An overview of the BD3D extension is described in section 6, while details can be found in Annex A of this White Paper.

The MVC format and the way it has been applied in Blu-ray enable the disc author to create S3D Blu-ray discs such that they can be played as 2D video on players that do not support stereoscopic playback, or in the case that the connected display does not support 3D display. To be able to select either 2D playback or S3D playback, the playback program information contains branches with playback instructions and settings for both options. The playback program has access to a set of 32-bit Player Setting Registers and Playback Status Registers (referred to as PSRs) that can be used to adapt e.g. playlist selection or playback options. For the extension of the Blu-ray format with S3D capabilities, additional PSRs were defined, including a PSR to indicate display capabilities. These display capabilities include a field to contain the horizontal display size, a bit to indicate whether or not glasses are required for stereoscopic display and a bit to indicate if the display is capable of displaying stereoscopic content. The playback program can for instance read the bit that indicates the stereoscopic capability of the display and select either the 2D or the S3D branch depending on the value.

A 3D video processing device like a BD player or set top box may be coupled to a 3D display device like a TV set or monitor for transferring the 3D video data via a display signal on suitable interface, preferably a high-speed digital interface like HDMI. High definition pixel data is transmitted along with audio from the source to the destination device. In addition to that, HDMI can carry data in both directions, e.g. for control purposes and to exchange status information. There is a possibility for the so-called EDID (Extended Display Identification Code), which allows a display to show its capabilities to a source device like a BD player. These EDID capability parameters include the various combinations of spatial resolutions and frame rates supported by the display.

The 3D display device receives a 3D display signal via the interface and provides different images to the respective eyes of a viewer to create a 3D effect. The display device may be a stereoscopic device, e.g. for a viewer wearing shutter glasses that pass left and right views displayed sequentially to the respective left and right eye of a viewer. However, the display device may also be an auto stereoscopic display that generates multiple views; different views being perceived by the respective eyes of a viewer not wearing glasses.

The invention is focused on the specific type of interlaced video data. Traditionally interlaced video data signals transfer even lines and odd lines of a video frame in two separate sets, usually called fields. Also for 3D video data various interlaced 3D display formats have been proposed, for example in the HDMI standard version 1.4a. The relevant part relating to 3D is described in the document "High-Definition Multimedia Interface, Specification Version 1.4a, Extraction of 3D Signaling Portion" of Mar. 4, 2010, available from http://www.hdmi.org/, which document describes the respective high resolution and lower resolution interlaced 3D formats as discussed further below.

When HDMI was extended to support 3D formats, two methods were defined to transmit stereoscopic (2-view) 3D. One method is to use the existing 2D format and to squeeze the two views (left and right) of stereoscopic video into the 2D format. Within this method there are 2 options: the side-by side configuration and the top-bottom configuration.

The other method is to double the number of video lines of an HDMI video frame and to transmit the 2 full HD views subsequently (L first) in this single HDMI frame. The latter method is called "frame packed".

HDMI defines a number of mandatory 3D formats. There are only 2 mandatory frame packing formats: 1080p24 and 720p50/60. These coincide with the Blu-ray S3D progressive video formats. The side-by-side and top-bottom formats do not provide a full resolution per eye quality, but they match 3D formats selected by broadcasters in various countries, having the advantage that existing AVC decoders designed for Full HD can be used to decode "frame compatible" (side-by-side or top-bottom) 3D video signals. These frame compatible formats include interlace video modes, as for broadcasting interlaced video is widely used.

US2009/0284652 describes a video processing system (VPS) that receives a plurality of video inputs and specifically tailors them to meet the audio/video format requirements of a plurality of recipient video devices. The VPS may query the recipient devices to obtain the audio/video format requirements of the video devices. Reformatting may involve transcoding the input signals to produce output video formats as needed. Multiple VPS may exchange information regarding their conversion capabilities, and an appropriate VPS may automatically be selected.

SUMMARY OF THE INVENTION

Recently there has been a desire to use interlaced 3D video information, for example to extend the S3D BD format with Full HD interlaced 3D video based on MVC coding, to enable to store interlaced 3D content on BD. Besides the fact that the BD format needs to be extended with a format that is not compliant with the installed base of BD3D players, there is a compliance issue at the HDMI interface with the display device. Assumed that the BD3D player is enhanced to decode the interlaced 3D video stream, there is a problem if the display device does not support a matching interlaced frame packing format.

It is an object of the invention to provide a system for processing interlaced 3D video data according to a high resolution interlaced 3D format that enables rendering on a 3D display device which does not support the high resolution interlaced 3D format.

For this purpose, according to a first aspect of the invention, the 3D display capability data indicates an interlaced 3D display format accepted by the 3D display device, the interlaced 3D display format differing from the interlaced frame packing format and being a side by side or a top bottom format, and the video processing device as described in the opening paragraph comprises storage means for storing the 3D display capability data and 3D conversion capability data in a status register, the 3D conversion capability data indicating a capability of the video processing device for interlaced conversion of the interlaced 3D format into the interlaced 3D display format for enabling a selection mechanism to control the processing of the 3D video information by reading the status register and accordingly selecting the interlaced 3D display format and the interlaced conversion.

For this purpose, according to a further aspect of the invention, the method as described in the opening paragraph comprises retrieving, from a status register, 3D display capability data and 3D conversion capability data, the 3D display capability data indicating an interlaced 3D display format accepted by the 3D display device, the interlaced 3D display format differing from the interlaced frame packing format and being a side by side or a top bottom format, and the 3D conversion capability data indicating a capability of the video processing device for interlaced conversion of the interlaced 3D format into the interlaced 3D display format, and controlling the processing of the 3D video information by, in dependence on the 3D display capability data and the 3D conversion capability data, —selecting the interlaced conversion.

The invention also provides a computer program product for controlling processing of 3D video information, which program is operative to cause a processor to perform the method as described above, and an optical record carrier comprising the computer program, and the 3D video information.

The above features have the following effect. The input means, for example an optical disc drive, receive 3D video data in a format as determined by the source, e.g. a broadcaster or movie studio. The video processor processes, e.g. unpacks and decodes the 3D video information, and generates a 3D display signal to be transferred to a 3D display device via the display interface, e.g. HDMI. The display interface is also arranged for receiving 3D display capability data from the 3D display device. The 3D display capability data indicates at least one interlaced 3D display format accepted by the 3D display device, which interlaced 3D display format differs from the interlaced frame packing format and is a side by side or a top bottom format. When the source selects an interlaced 3D video format, the video processing device determines whether conversion of the interlaced 3D video to the interlaced 3D display format is possible based on the 3D conversion capability data, which indicates the capability of the video processing device for interlaced conversion of the interlaced 3D format into the interlaced 3D display format. The device has storage means for storing, in a status register, the 3D display capability data and the 3D conversion capability data. By retrieving from the status register, the 3D display capability data and the 3D conversion capability data, the selection mechanism is able to control the processing of the 3D video information by selecting the interlaced 3D display format and the interlaced conversion, for example a selection mechanism provided in the video processor and activated when a medium is inserted in the device. Advantageously the stored 3D display capability data and 3D conversion capability data enable an easy and executable control step for setting up a conversion function whenever there is a mismatch between input interlaced 3D video data and supported interlaced 3D display formats.

The invention is also based on the following recognition. When interlaced 3D video input data of a specific resolution is to be outputted to a display having a different resolution, various options are apparent. Traditionally 3D displays have at least support for 2D formats and a few progressive 3D video formats. A basic option would be to automatically switch back to the best available shared format, e.g. a 2D format. A further option would be to convert the interlaced 3D video to progressive 3D video. However, the inventors have seen that such conversion, although possible, may involve a lot of processing power, whereas quality of the progressive 3D video signal may still be relatively low. Providing the capability to convert interlace 3D video input data having a resolution matching an interlaced frame packing format to a display interlaced 3D format differing from the interlaced frame packing format and being a side-by-side or a top-bottom format, requires less processing power. Also the quality after conversion is usually still acceptable.

Moreover, as described in US2009/0284652, the prior art may require dynamically detecting any available conversion capabilities, e.g. by exchanging capability data between various processing units. By storing both the display 3D capability and the interlaced conversion capability in a status register, and thereby making the capability data available to a selection mechanism, the selection mechanism is in full control of selecting the most suitable display format. In particular, providing the selection mechanism as a function implemented on the medium that also carries the 3D video information, such as a Blu-ray Disc, enables the source side, e.g. the movie studio, to determine which selection is to be made in dependence of the retrieved capability data.

Optionally, the storage means is arranged for storing an interlaced 3D decoding capability of the video processing device for enabling the selection mechanism to engage, in dependence of the interlaced 3D decoding capability, generating the 3D display signal by decoding the 3D video data. Advantageously the selection mechanism determines, in dependence of the stored capability decoding data, whether playback of the high resolution interlaced 3D format is available.

Optionally, the storage means is arranged for storing a 3D interlace status for a medium carrying the 3D video data, for enabling the selection mechanism to adapt said control in dependence of the 3D interlace status, when receiving 3D video data from said medium. The stored interlace status is a preference for the medium with respect to selecting the interlaced 3D display format and the interlaced conversion. Advantageously, when the medium is to be rendered a second time, the status is retrieved and used to avoid repeating similar questions or messages to the user.

Optionally, the 3D conversion capability data indicates multiple capabilities of the video processing device for interlaced conversion of the interlaced high resolution 3D format into respective different interlaced 3D display formats, and/or interlaced conversion of respective different interlaced high resolution 3D formats into the interlaced 3D display format. Advantageously, detailed capability data is available for determining an optimum match between the input format, display format, and the conversion capability.

Optionally, the selection mechanism is implemented as a control function of the video processor. For example, a standard function may be added to a predetermined set of functions made available to a host device or multimedia program that is controlling the video processing device.

Optionally, the selection mechanism comprises providing a user input for enabling a user to control the display format and/or the interlaced conversion. The user may further control the selection via the user input, e.g. a pop-up message and buttons.

Optionally, the selection mechanism comprises alternatively selecting a 2D display signal in dependence of the 3D conversion capability data. Advantageously, when no suitable interlaced conversion is selectable, the mechanism controls the processor to generate the 2D display signal, which will be always displayed on any display device.

Optionally the display interface is a High Definition Multimedia Interface [HDMI] arranged for said receiving the 3D display capability data from the 3D display device via Enhanced Extended Display Identification Data [E-EDID]. This has the advantage that the HDMI standard used for transferring the 3D display capability data.

Optionally, the method comprises at least one of the steps:
generating a message to be displayed to inform a user that 3D playback is not possible when an interlaced 3D decoding capability of the video processing device indicates that generating the 3D display signal by decoding the 3D video data is not available;
generating a message to be displayed to inform a user that 3D playback is not possible when the interlaced 3D conversion capability data indicates that interlaced conversion is not available;
selecting an alternative program when 3D playback is not possible;
selecting a 2D version of the 3D video information when 3D playback is not possible;
generating a message to be displayed to inform a user that 3D playback is possible at a reduced resolution when selecting the interlaced 3D display format and the interlaced conversion;
generating a message to be displayed listing the 3D display capability data and/or the 3D conversion capability data and enabling a user to select the display format and/or the interlaced conversion.

Advantageously the messages and/or selected program or conversion enable the user to enjoy the best possible display mode for the 3D video information.

Optionally a computer program is provided that implements the above methods and steps.

Optionally, the input means comprises an optical disc unit for receiving the 3D video data from an optical disc. The optical record carrier may comprise the above computer program, and the 3D video information. Advantageously, the optical record carrier can be manufactured in accordance with the Blu-ray Disc (BD) system, and the computer program product may be in accordance with Java programming requirements, e.g. as defined in the BD system.

Further preferred embodiments of the devices and method according to the invention are given in the appended claims, disclosure of which is incorporated herein by reference. Features defined in dependent claims for a particular method or device correspondingly apply to other devices or methods.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described have the same reference numerals.

DETAILED DESCRIPTION OF EMBODIMENTS

Figure 1:
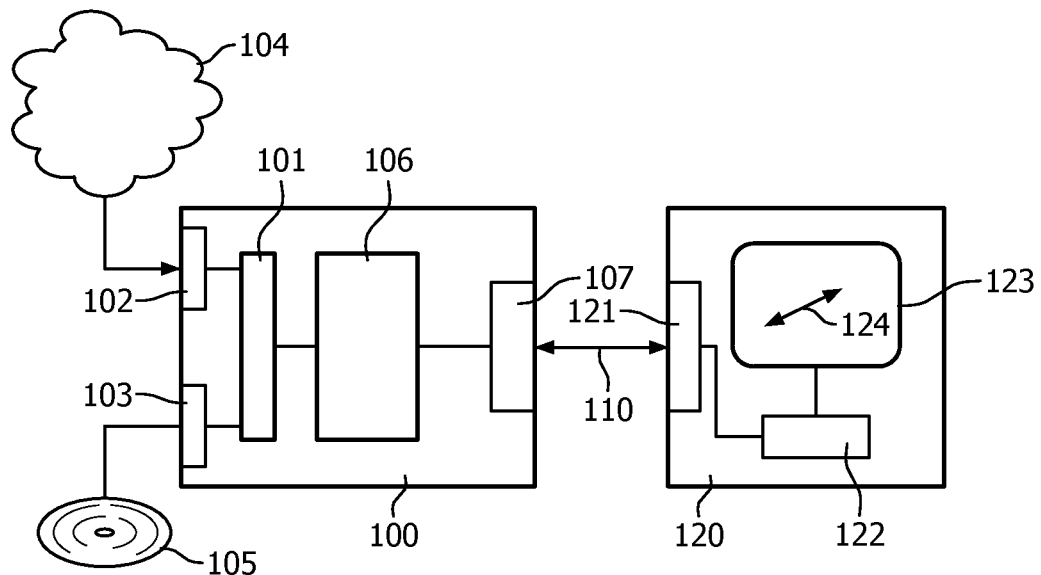
FIG. 1 shows a system for processing 3D video information.

FIG. 1 shows a system for processing three dimensional (3D) video information. The 3D video information includes 3D video data, also called main video data, and may include auxiliary data, such as subtitles, graphics and other additional visual information. A 3D video processing device 100 is coupled to a 3D display device 120 for transferring a 3D display signal 110.

The 3D video processing device has input means for receiving the 3D video data according to an input format, including an input unit 101 for retrieving the 3D video data, e.g. a video disc player, media player or a set top box. For example the input means may include an optical disc unit 103 for retrieving video and auxiliary information from an optical record carrier 105 like a DVD or Blu-ray Disc (BD). In an embodiment the input means may include a network interface unit 102 for coupling to a network 104, for example the internet or a broadcast network. Video data may be retrieved from a broadcaster, remote media server or website. The 3D video processing device may also be a satellite receiver, or a media server directly providing the display signals, i.e. any video device that outputs a 3D display signal to be coupled to a display device. The device may be provided with user control elements for setting user preferences, e.g. rendering parameters of 3D video.

The 3D video processing device has a video processor 106 coupled to the input unit 101 for processing the video information for generating a 3D display signal 110 to be transferred via a display interface unit 107 to the display device. The auxiliary data may be added to the video data, e.g. overlaying subtitles on the main video. The video processor 106 is arranged for including the video information in the 3D display signal 110 to be transferred to the 3D display device 120. The video processor is provided with a function to convert high resolution interlaced 3D video input data to a lower resolution interlaced 3D format, which is called interlaced conversion, in particular interlaced 3D down-conversion. For example, full HD frame packed interlaced 3D video data may be down converted to the side-by-side half 3D format.

The 3D display device 120 is for displaying 3D video information. The device has a 3D display 123 receiving 3D display control signals for displaying the video information by generating multiple views, for example a left view and a right view for the respective eyes of a viewer wearing shutter glasses or multiple views for viewers without dedicated eyewear using a lenticular LCD. The device has a display interface unit 121 for receiving the 3D display signal 110 including the 3D video information transferred from the 3D video processing device 100. The device has a display processor 122 coupled to the interface 121. The transferred video data is processed in the display processor 122 for generating the 3D display control signals for rendering the 3D video information on a 3D display 123 based on the 3D video data. The display device 13 may be any type of stereoscopic display that provides multiple views, and has a display depth dimension indicated by arrow 124. The display device may be provided with user control elements for setting display parameters of the display, such as contrast, color or depth parameters.

The input unit 101 is arranged for retrieving video data from a source. The video processor 106 is arranged for processing the 3D video information, as follows. The video processor processes the 3D video information and generates the 3D display signal. The 3D display signal represents the 3D video data and the auxiliary data according to a display format, e.g. HDMI. The display interface 107 interfaces with the 3D display device 120 for transferring the 3D display signal. The video processing device 100 is arranged for receiving 3D display capability data from the 3D display device, the 3D display capability data indicating an interlaced 3D display format accepted by the 3D display device, e.g. dynamically when coupled to the display device. The 3D display capability data is discussed below in detail.

The display processor 122 is arranged for providing a display control signal representing the multiple views to the 3D display based on the 3D display signal as received on the interface 121. The display device is arranged for transferring the 3D display capability data to the video processing device. The 3D display capability data may be stored in a memory, e.g. provided during production of the 3D display device. The display processor, or a further controller, may transfer the 3D display capability data via the interface, i.e. in the direction towards the video processing device. The display processor is arranged for providing the display control signal based on retrieving, from the display signal, the respective 3D video data.

The 3D video information, e.g. on a storage medium, contains video data and playback program information. The video data contains at least one or more coded stereoscopic video streams and may also include other data like coded audio streams and graphical information. The video playback device is designed to read and interpret the playback program information from the storage device and to read and decode the video streams according to instructions and playback settings included in the playback program information. The playback capabilities of the playback device may be restricted to a subset of capabilities defined in a standard with which the data on the storage medium has to comply. The decoded video data, possibly blended with graphical data, is subsequently formatted into a video output data format in compliance with a video interface standard and transmitted to the display device.

The video processing device, in operation, performs the following functions for processing the 3D video information. The input unit receives the 3D video data according to a high resolution interlaced 3D format, for example stereoscopic full HD at 1920×1080 interlaced. The video processor 106 processes the 3D video information and generates a 3D display signal, the 3D display signal representing the 3D video data according to a display format. The display interface 107 is connected to the 3D display device 120 for transferring the 3D display signal 110. The display interface also receives 3D display capability data from the 3D display device. The 3D display capability data indicates one or more interlaced 3D display formats accepted by the 3D display device. The interlaced 3D display format may have a lower resolution than the high resolution interlaced 3D format, and hence no direct match with the input interlaced 3D video format is available. Hence the interlaced 3D input format is to be down converted to a lower resolution interlaced 3D display format. The down conversion capability of the device is indicated by 3D conversion capability data, the 3D conversion capability data indicating a capability of the video processing device for interlaced conversion of the high resolution interlaced 3D format into the interlaced 3D display format.

The device engages storage means such as memory registers and stores the 3D display capability data and the 3D conversion capability data, for enabling a selection mechanism to control the processing of the 3D video information by selecting the interlaced 3D display format and the interlaced conversion.

The storage unit may be arranged for storing an interlaced 3D decoding capability of the video processing device. The selection mechanism may now engage, in dependence of the interlaced 3D decoding capability, generating the 3D display signal by decoding the 3D video data. Optionally, the storage unit is arranged for storing a 3D interlace status for a medium carrying the 3D video data, for enabling the selection mechanism to adapt said control in dependence of the 3D interlace status, when receiving 3D video data from said medium. Hence, when the medium is played again, the status established earlier may be used.

The 3D conversion capability data may indicate multiple capabilities of the video processing device for interlaced conversion of the interlaced high resolution 3D format into respective different interlaced 3D display formats, for example different interlaced 3D formats may be individually indicated, e.g. by separate bits, to be available as target format after conversion. Also, interlaced conversion of respective different input interlaced high resolution 3D formats may be individually indicated, e.g. by separate bits, to be available for conversion into one or more target interlaced 3D display formats.

The selection mechanism may be part of a playback program that is provided with the 3D video information, e.g. on the medium that also contains the interlaced 3D video information, such as a BD. The selection mechanism may be implemented using Java in accordance with Java programming requirements as defined in the BD system, so called BD-J.

Optionally, the selection mechanism may be implemented as a control function of the video processor. Such a control function may be activated on request, e.g. by the user or by the playback program of the medium, or by a broadcaster which transmits the interlaced 3D video information. The selection mechanism may provide a user input for enabling a user to control the display format and/or the interlaced conversion. Also, the selection mechanism may include alternatively selecting a 2D display signal in dependence of the 3D conversion capability data, or based on a user input.

In an embodiment of the video processing device, the display interface is arranged for receiving 3D display capability data from the 3D display device via the 3D display signal. The 3D display capability data may be included by the 3D display device in a bi-directional signal as transferred over a suitable high speed digital video interface, e.g. in a HDMI signal using the well known HDMI interface (e.g. see "High Definition Multimedia Interface Specification Version 1.3a of Nov. 10, 2006), in particular see section 8.3 on the via Enhanced Extended Display Identification Data, the E-EDID data structure, extended to define the 3D display capability data as defined below. Hence in a further embodiment the display interface is a High Definition Multimedia Interface [HDMI] arranged for said receiving the 3D display capability data from the 3D display device via Enhanced Extended Display Identification Data [E-EDID]. Specific examples are described below.

The player device is extended by a decoder for decoding an interlaced 3D video stream. However, there is a chance that the display device does not support a matching interlaced frame packing format. For example, in HDMI only a few progressive frame packing video formats are mandatory. HDMI version 1.4a defines for an HDMI Sink which supports at least one 59.94/60 Hz 2D video format support all of
1920×1080p@23.98/24 Hz Frame packing
1280×720p@59.94/60 Hz Frame packing
1920×1080i@59.94/60 Hz Side-by-Side (Half)
1920×1080p@23.98/24 Hz Top-and-Bottom
1280×720p@59.94/60 Hz Top-and-Bottom
For an HDMI Sink which supports at least one 50 Hz 2D video format should support all of
1920×1080p@23.98/24 Hz Frame packing
1280×720p@50 Hz Frame packing
1920×1080i@50 Hz Side-by-Side (Half)
1920×1080p @23.98/24 Hz Top-and-Bottom
1280×720p@50 Hz Top-and-Bottom
If the display device does not support a matching interlaced frame packing format, the player is further extended to convert the decoded high resolution HD interlaced 3D video signal (also called Full HD interlaced 3D video signal) to a lower resolution (also called half HD) side-by-side or top-bottom format that is supported by the 3D display device. The result will be that the interlaced 3D video signal is rendered on the connected display device, although providing a somewhat lower quality video picture.

It is noted that the proposed system reduces user confusion and potential annoyance that might be caused when Interlaced S3D (IS3D) video material, e.g. on BD, is introduced in the market. Thereto a set of player interlaced conversion capabilities and display interlaced 3D capabilities is made available to the playback program through a storage unit. In BD such a storage system is called the Player Status Register (PSR) mechanism. By retrieving the player interlaced conversion capabilities and display interlaced 3D capabilities a disc author is enabled to select an appropriate playlist, conversion or generate messaging regarding possible issues most suitable in the particular situation.

In an embodiment, among the player capabilities to be stored in PSR bits are "capable of decoding interlaced 3D" and "capable of interlaced 3D conversion to mandatory HDMI format". These capabilities are intrinsic capabilities of the player and are generally fixed in the PSR, although it may be possible to have them user configurable. Among the display device capabilities to be stored in a PSR bit are "display device supports interlace frame packing". The value of this PSR bit is depending on the capabilities of the connected 3D display device and may be updated each time a connection is established. The source device may check the EDID information from the display to see if the Full HD interlaced format used on the disc is supported and derive the PSR bit value from this. Alternatively the bits are determined based on user input.

Figure 2:
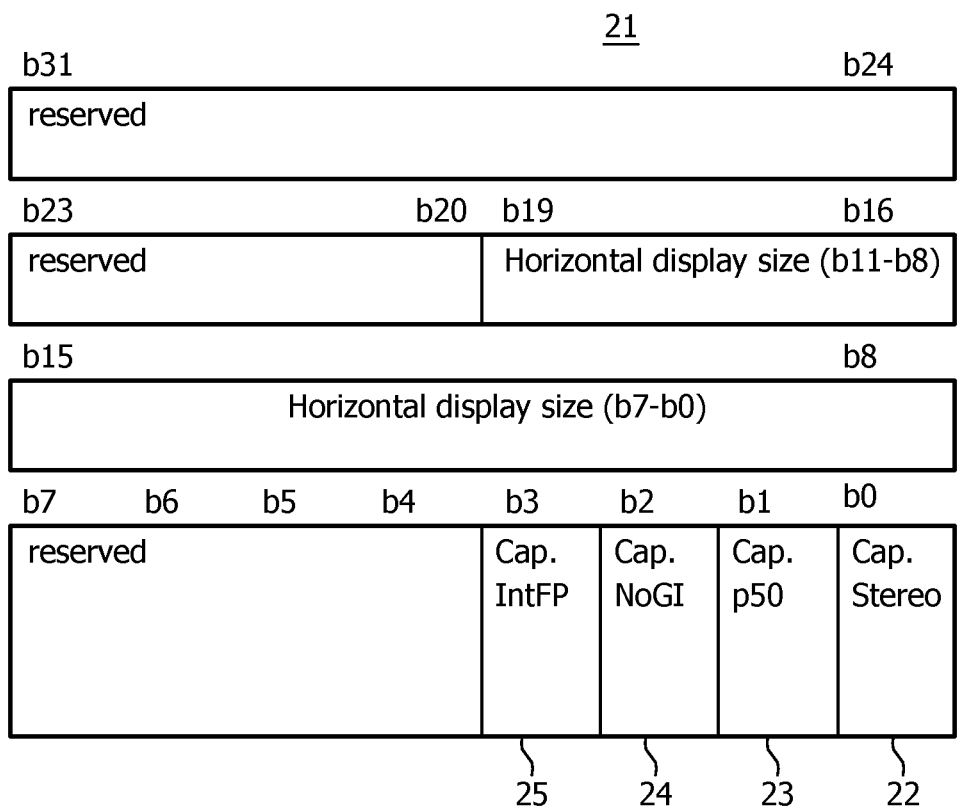
FIG. 2 shows a storage unit having 3D display capability data.

FIG. 2 shows a storage unit having 3D display capability data. The storage unit 21 is schematically shown to have 4 bytes, i.e 32 bits (b31 to b0) of storage capacity. The embodiment is similar to a Player Status Register (PSR) of the Blu-ray system, e.g. PSR 23. A number of bits of PSR23 (Display Capability) b0-3 and b8-19 is defined as follows. The horizontal display size is stored in bits b19-b8 of PSR23, the value (b11-b0) gives the connected display's horizontal size in centimeters.

Bit b0 22 marked Cap. Stereo stores Stereoscopic Display Capability of the Connected TV system, where:
0b=Incapable of displaying Stereoscopic 1920×1080/23.976 Hz Progressive video and Stereoscopic 1280×720/59.94 Hz Progressive video;
1b=Capable of displaying Stereoscopic 1920×1080/23.976 Hz Progressive video and Stereoscopic 1280×720/59.94 Hz Progressive video.

Bit b1 23, marked Cap.p50, stores Stereoscopic 1280×720 50p video Display Capability of the Connected TV system, where:
0b=Incapable of displaying Stereoscopic 1280×720/50 Hz Progressive video;
1b=Capable of displaying Stereoscopic 1280×720/50 Hz Progressive video.

Bit b2 24, marked Cap.NoGl, stores No glasses required for stereoscopic display of the Connected TV system, where:
0b=needs glasses to watch Stereoscopic Output mode;
1b=does not need glasses to watch Stereoscopic Output mode.

For enabling to generate an output interlaced 3D video signal that is supported the respective capabilities of the connected 3D display system are defined.

Bit b3 25, marked Cap.IntFP, stores Interlace Frame Packing Capability of the Connected TV system, where
0b=the display device does not support the interlace frame packing mode required to display Full HD interlaced 3D video;
1b=the display device supports the interlace frame packing mode required to display Full HD interlaced 3D video.

It is noted that the single bit b3 indicated the capability of the video display device for to receive respective interlaced 3D formats, and may be defined to indicate that a specific set of interlaced 3D video modes are supported which are mandatory according to a predefined standard, e.g. HDMI 1.4a.

Figure 3:
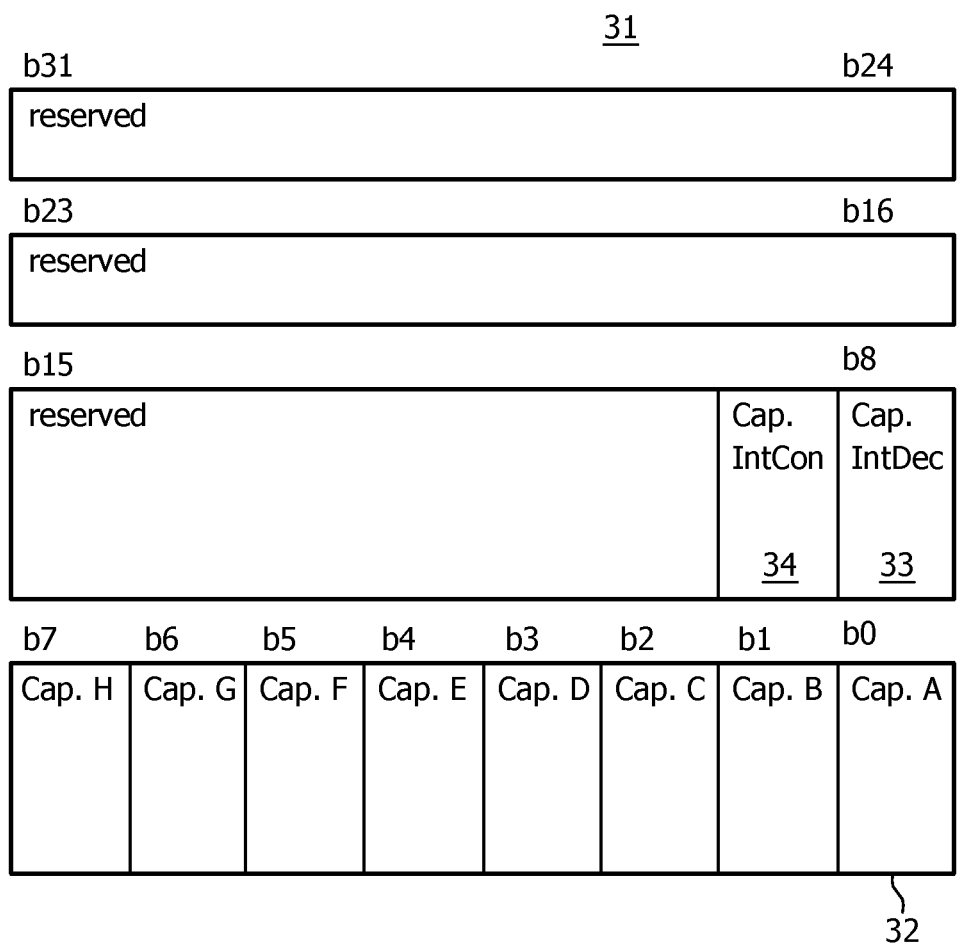
FIG. 3 shows a storage unit having 3D interlaced capability data of the video processing device.

Optionally further PSR bits, e.g. b4-b7, may be used to indicate further different interlaced 3D video modes supported by the connected display device. Also, a set of bits may be defined to indicated each individual interlaced 3D format that is supported, such as the side-by side configuration and the top-bottom configuration, or a further format which doubles the number of video lines of an HDMI video frame and transmits the 2 full HD views subsequently (L first) in this single HDMI frame FIG. 3 shows a storage unit having 3D interlaced capability data of the video processing device. The storage unit 31 is schematically shown to have 4 bytes, i.e. 32 bits (b31 to b0) of storage capacity. The embodiment is similar to a Player Status Register (PSR) of the Blu-ray system, e.g. PSR 24 (3D Capability of the player device). A number of bits of PSR24, b0-7, have been defined to indicate various 3D related capabilities of the device itself, marked Cap.A to Cap.H. For example, b0 marked Cap.A 32 may define a capability to process 1280×720/50 Hz progressive video.

For enabling to generate an output interlaced 3D video signal that is supported the interlaced 3D decoding capabilities of the video processing device for decoding a high resolution interlaced 3D format, and interlaced 3D conversion capabilities for interlaced conversion of the high resolution interlaced 3D format into a lower resolution interlaced 3D display format, are defined.

Bit b8 33 marked Cap.Stereo stores an Interlaced 3D decoding Capability of the device, where:
0b=Incapable of decoding Interlaced 3D video streams;
1b=Capable of decoding Interlaced 3D video streams.

Bit b9 34 marked Cap.IntCon stores an Interlaced 3D conversion Capability, where:
0b=Incapable of converting decoded Interlace 3D video streams to lower resolution 3D format supported by display device;
1b=Capable of converting decoded Interlace 3D video streams to lower resolution 3D format supported by display device.

The playback program on the disc may read the above information from the PSRs and responds to the different cases in dependence on the 3D display capability data and the 3D conversion capability data, by at least one of selecting the interlaced 3D display format; selecting the interlaced conversion; and generating a message to be displayed to inform a user about 3D playback capabilities. The message may for example state that 3D playback is not possible, or only possible with reduced resolution, and may be accompanied by a user selection menu or button, such as an option to select a 2D version. Detailed responses are for example:
(1) Player is not capable of decoding interlaced 3D. A message is displayed to inform the user that 3D play back is not possible. Optionally an alternative program is selected, e.g. a 2D version of the S3D program.
(2) Player is capable of decoding interlaced 3D, but the display device does not support interlaced frame packing mode. Also, the player has no conversion capability. A message is displayed to inform the user that 3D play back is not possible. Optionally an alternative program is selected, e.g. a 2D version of the S3D program.
(3) Player is capable of decoding interlaced 3D, but the display device does not support interlaced frame packing mode. However, the player does have the capability to convert the Full HD video signal to one of the mandatory HDMI formats. A message is displayed to inform the user that 3D play back is possible, but that there might be some quality loss.

In a further embodiment, rather than exposing the display and playback device capabilities in a condensed way as described above, the various capabilities could be explicitly listed. For example, a relevant subset of the various display modes available through EDID is signaled through PSRs. Also, the playback device could have multiple conversion options (e.g. to side-by-side, to top-bottom, to 1280× 720p60). The full set could be signaled through multiple bits in the PSRs.

The playback program on the disc may include a strategy to reduce annoyance by storing a history of message display as 3D interlace status for the respective medium or video program, or for a respective provider or broadcaster of 3D video. For instance, it is not necessary to display a message that the quality is reduced each time a disc is played, especially as long as the capability setting bits have not been changed.

Optionally, the selection mechanism or corresponding function of the playback program may include any combination of the following:
  generating a message to be displayed to inform a user that 3D playback is not possible when an interlaced 3D decoding capability of the video processing device indicates that generating the 3D display signal by decoding the 3D video data is not available;
  generating a message to be displayed to inform a user that 3D playback is not possible when the interlaced 3D conversion capability data indicates that interlaced conversion is not available, while the interlace frame packing capability indicates that the connected TV does not support interlace frame packing mode matching the input format;
  selecting an alternative program when 3D playback is not possible;
  selecting a 2D version of the 3D video information when 3D playback is not possible;
  generating a message to be displayed to inform a user that 3D playback is possible at a reduced resolution when selecting the interlaced 3D display format and the interlaced conversion;
  generating a message to be displayed listing the 3D display capability data and/or the 3D conversion capability data and enabling a user to select the display format and/or the interlaced conversion.

The messages and corresponding user input, and/or the selected video stream, and/or the activated 3D interlace conversion enable the user to enjoy the best possible display mode for the 3D video information on the connected 3D display device.

It is to be noted that the invention may be implemented in hardware and/or software, using programmable components. A method for implementing the invention has the steps corresponding to the functions defined for the system as described with reference to FIG. 1.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. Video processing device for processing three dimensional (3D) video information, the 3D video information comprising 3D video data, the video processing device comprising:
   an input configured to receive 3D video information comprising 3D video data according to an interlaced 3D format having a resolution matching an interlaced frame packing format and a selection mechanism from a medium carrying 3D video information and the selection mechanism as a function,
   a video processor configured to process the 3D video information and generating a 3D display signal of pixel data, the 3D display signal representing the 3D video data according to a display format,
   a display interface configured to interface with a 3D display device to transfer the 3D display signal, the display interface configured to receive 3D display capability data from the 3D display device, the 3D display capability data indicating an interlaced 3D display format accepted by the 3D display device, the interlaced 3D display format differing from the interlaced frame packing format and being a side-by-side or a top-bottom format,
   a storage configured to store the 3D display capability data and 3D conversion capability data in a status register, the 3D conversion capability data indicating a capability of the video processing device for interlaced conversion of the interlaced 3D format into the interlaced 3D display format, and
   the video processor configured to control the processing of the 3D video information via the selection mechanism, by:
      reading the status register,
      selecting the interlaced 3D display format depending on the stored 3D display capability data and stored 3D conversion capability data, and
      depending on the selection, processing the interlaced conversion by converting the 3D video information, according to the interlaced frame packing format, to the interlaced 3D display format being a side-by-side or a top-bottom format.

2. The video processing device of claim 1, wherein the storage is configured to store an interlaced 3D decoding capability of the video processing device for enabling the selection mechanism to engage, in dependence of the interlaced 3D decoding capability, generating the 3D display signal by decoding the 3D video data.

3. The video processing device of claim 1, wherein the storage is configured to store a 3D interlace status for a medium carrying the 3D video data, the stored interlace status being a preference for the medium with respect to selecting the interlaced 3D display format and the interlaced conversion, for enabling the selection mechanism to adapt the control in dependence of the 3D interlace status, when receiving 3D video data from the medium.

4. The video processing device of claim 1, wherein the 3D conversion capability data indicates multiple capabilities of the video processing device for interlaced conversion of the interlaced 3D format into respective different interlaced 3D display formats, and/or interlaced conversion of respective different interlaced 3D formats into the interlaced 3D display format.

5. The video processing device of claim 1, wherein the selection mechanism comprises providing a user input configured to enable a user to control the display format and/or the interlaced conversion.

6. The video processing device of claim 1, wherein the selection mechanism comprises alternatively selecting a 2D display signal depending on the 3D conversion capability data.

7. The video processing device of claim 1, wherein the input comprises an optical disc unit for receiving the 3D video data from an optical disc and/or the display interface is a High Definition Multimedia Interface (HDMI) configured to receive the 3D display capability data from the 3D display device via Enhanced Extended Display Identification Data (E-EDID).

8. A method of operating a video processing device to control the processing of three dimensional (3D) video information, the method comprising:
   receiving via an input, 3D video information comprising 3D video data according to an interlaced 3D format having a resolution matching an interlaced frame packing format,
   processing by a video processor, the 3D video information comprising generating a 3D display signal of pixel data for a 3D display device, the 3D display signal representing the 3D video data according to a display format,
   controlling by the video processor, the processing of the 3D video information via the selection mechanism as a function, by:
      retrieving, from a status register of a storage, 3D display capability data and 3D conversion capability data, the 3D display capability data indicating an interlaced 3D display format accepted by the 3D display device, the interlaced 3D display format differing from the interlaced frame packing format and being a side by side or a top-bottom format, and the 3D conversion capability data indicating a capability of the video processing device for interlaced conversion of the interlaced 3D format into the interlaced 3D display forma t,
      selecting the interlaced 3D display format depending on the 3D display capability data and the 3D conversion capability data, and depending on the selection, processing the interlaced conversion by converting the 3D video according to the interlaced frame packing format to the interlaced 3D display format being a side-by-side or a top-bottom format.

9. The method of claim 8, comprising at least one of the acts:
generating a message to be displayed to inform a user that 3D playback is not possible when an interlaced 3D decoding capability of the video processing device indicates that generating the 3D display signal by decoding the 3D video data is not available;
generating a message to be displayed to inform a user that 3D playback is not possible when the interlaced 3D conversion capability data indicates that interlaced conversion is not available;
selecting an alternative program when 3D playback is not possible;
selecting a 2D version of the 3D video information when 3D playback is not possible;
generating a message to be displayed to inform a user that 3D playback is possible at a reduced resolution when selecting the interlaced 3D display format and the interlaced conversion;
generating a message to be displayed listing the 3D display capability data and/or the 3D conversion capability data and enabling a user to select the display format and/or the interlaced conversion.

10. A Computer program product that is not a transitory propagating signal or wave, controlling a video processing device for processing of 3D video information, which program product is operative to cause a processor to perform the method of claim 8.

11. An optical record carrier comprising the computer program product of claim 10, and the 3D video information.

12. The optical record carrier of claim 11, wherein the optical record carrier is in accordance with the Blu-ray Disc system and the computer program product is in accordance with Java programming requirements.

13. A video processing device to control the processing of three dimensional [3D] video information, the video processing device comprising:
an input configured to receive 3D video information comprising 3D video data according to an interlaced 3D format having a resolution matching an interlaced frame packing format,
a video processor configured to process the 3D video information comprising generating a 3D display signal of pixel data for a 3D display device, the 3D display signal representing the 3D video data according to a display format,
the video processor configured to control the processing of the 3D video information via the selection mechanism as a function, by:
a status register of a storage configured to provide 3D display capability data and 3D conversion capability data, the 3D display capability data indicating an interlaced 3D display format accepted by the 3D display device, the interlaced 3D display format differing from the interlaced frame packing format and being a side by side or a top-bottom format, and the 3D conversion capability data indicating a capability of the video processing device for interlaced conversion of the interlaced 3D format into the interlaced 3D display format,
selecting by the selection mechanism, the interlaced 3D display format depending on the 3D display capability data and the 3D conversion capability data, and
depending on the selection, processing the interlaced conversion by converting the 3D video according to the interlaced frame packing format to the interlaced 3D display format being a side-by-side or a top-bottom format.

14. A video processing device configured to process three dimensional [3D] video information, the device comprising:
an input configured to receive 3D video information comprising 3D video data according to an interlaced 3D format having a resolution matching an interlaced frame packing format,
a storage configured to store video data received in an interlaced 3D format, and converted video data associated with an interlaced 3D display format, a conversion capability selection and a processing method selection,
a video processor configured to:
receive the 3D video data from the input and store it in the storage,
generate a 3D display signal representing the 3D video data according to a display format, wherein the display format represents an interlaced 3D display format of an associated 3D display device, wherein the interlaced 3D display format differs from the interlaced frame packing format,
select between multiple available 3D conversion capabilities depending on the received interlaced 3D display format, and
select between multiple processing methods for displaying the 3D video data based on the received interlaced 3D display format and the selected 3D display conversion capability,
wherein, the 3D conversion capability is configured to convert the video data received in the interlaced 3D format into converted video data associated with the interlaced 3D display format.

15. The video processing device as claimed in claim 14, wherein the processor is configured to:
decode the received 3D video data; and
generate the 3D display signal from the decoded 3D video data depending on the selected 3D conversion capability.

16. The video processing device as claimed in claim 14, wherein the processor is configured to:
receive from a medium the 3D video data;
receive a 3D interlace status associated with the medium, the 3D interlace status representing a preference of the medium with respect to the interlaced 3D display format; and
select a processing for displaying the 3D video data based on the received 3D interlace status.

17. The video processing device as claimed in claim 14, wherein the 3D conversion capability comprises a plurality of conversions of the interlaced 3D format into respective different interlaced 3D display formats.

18. The video processing device as claimed in claim 14, wherein processor is configured to receive a user input enabling a user to control at least one of: the display format and the selected conversion method.

19. The video processing device as claimed in claim 14, wherein the processor is configured to select a 2D display format in dependence of a failure to determine an appropriate one of the plurality of 3D conversion capability.

20. The video processing device as claimed in claim 14, wherein the processor is configured to:
determining a medium carrying the 3D video information; and
determine the 3D data format based on the determined medium.

21. The video processing device as claimed in claim 14, wherein the processor is configured to: receive the 3D video data from one of: a local source, a wired source and a wireless source, wherein the local source is selected from a group consisting of: an optical disc, a disk drive and a local media server, the wired source is selected from a group consisting of: a remote media server via the internet and a website via the internet, and the wireless source may be selected from a group consisting of: a satellite receiver, a local media server via WiFi, and a cellular network.

22. The video processing device as claimed in claim 14, wherein the processor is configured to receive the 3D display capability data from the 3D display device via Enhanced Extended Display Identification Data [E-EDID].

23. The video processing device as claimed in claim 14, wherein the processor is configured to receive the 3D display capability data from the display device via a High Definition Multimedia Interface [HDMI].

24. The video processing device as claimed in claim 14, further comprising: a storage medium configured to: store the plurality of 3D conversion capability data.

25. The video processing device as claimed in claim 19, wherein the processor is configured to generate a message indicating operation in a 2D mode.

26. The video processing device as claimed in claim 14, wherein the processor is configured to convert high resolution 3D input data into lower resolution 3D display format based on the selected conversion capability.

27. The video processing device as claimed in claim 14, wherein the 3D video data further comprises auxiliary data.

28. The video processing device as claimed in claim 26, wherein the lower resolution 3D format is one of: a side-by-side; and a top-bottom format.

29. A method for processing and displaying three dimensional (3D) data the method, performed in a video processing device, comprising:
receiving into an input, 3D video data according to an interlaced 3D format having a resolution matching an interlaced frame packing format,
receiving 3D display capability data associated with display device, the 3D display capability data indicating an interlaced 3D display format accepted by the display device, the interlaced 3D display format differing from the interlaced frame packing format and being a side-by-side or a top-bottom format;
determining, via a video processor, from a plurality of 3D conversion capability data, a 3D conversion capability data, the 3D conversion capability data indicating a capability of the video processing device for interlaced conversion of the interlaced 3D format into the interlaced 3D display format;
converting via the video processor, the received 3D video data into converted 3D video data, depending on the determined 3D conversion capability data;
generating a display signal representing the converted 3D video data, and
outputting the display signal to the display device.

30. The method as claimed in claim 29, further comprising at least one of:
generating a message to be displayed to inform a user that 3D playback is not possible when the video processing device indicates that generating the 3D display signal is not available;
generating a message to be displayed to inform a user that 3D playback is not possible when the interlaced 3D conversion capability data indicates that interlaced conversion is not available; selecting an alternative program when 3D playback is not possible;
selecting a 2D version of the 3D video information when 3D playback is not possible;
generating a message to be displayed to inform a user that 3D playback is possible at a reduced resolution when selecting the interlaced 3D display format and the interlaced conversion; and
generating a message to be displayed listing at least one of: the 3D display capability data and the 3D conversion capability data and enabling a user to select at least one of: the display format and the interlaced conversion.

31. A computer program product that is not a propagating wave or signal, configured to control a video processing device configured to process three dimensional (3D) video information, to:
receive from an input, 3D video data according to an interlaced 3D format having a resolution matching an interlaced frame packing format,
generate a 3D display signal representing the 3D video data according to a display format, wherein the display format represents an interlaced 3D display format of an associated 3D display device, wherein the interlaced 3D display format differs from the interlaced frame packing format,
select an available 3D conversion capability based on the received interlaced 3D display format, and
select a processing for displaying the 3D video data depending on the received interlaced 3D display format and the selected 3D display conversion capability, wherein, the 3D conversion is configured to convert the video data received in the interlaced 3D format into converted video data associated with the interlaced 3D display format.

* * * * *